(12) United States Patent
Borchardt et al.

(10) Patent No.: US 12,539,763 B2
(45) Date of Patent: Feb. 3, 2026

(54) CURRENT COLLECTOR AND METHOD FOR POWER TRANSMISSION

(71) Applicant: SCHUNK TRANSIT SYSTEMS GMBH, Wettenberg (DE)

(72) Inventors: Oliver Borchardt, Buseck (DE); Tamer Yildirim, Altenstadt (DE); Peter Schneider, Fronhausen (DE); Martin Sommer, Weimar (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 378 days.

(21) Appl. No.: 17/786,333

(22) PCT Filed: Dec. 20, 2019

(86) PCT No.: PCT/EP2019/086624
§ 371 (c)(1),
(2) Date: Jun. 16, 2022

(87) PCT Pub. No.: WO2021/121620
PCT Pub. Date: Jun. 24, 2021

(65) Prior Publication Data
US 2024/0025263 A1    Jan. 25, 2024

(51) Int. Cl.
*B60L 5/39* (2006.01)
*B60L 5/08* (2006.01)
*B60L 5/38* (2006.01)

(52) U.S. Cl.
CPC ...... *B60L 5/39* (2013.01); *B60L 5/08* (2013.01); *B60L 5/38* (2013.01); *B60L 2200/26* (2013.01)

(58) Field of Classification Search
CPC ...... B60L 5/00; B60L 5/08; B60L 5/38; B60L 5/39; B60L 2200/26
See application file for complete search history.

(56) References Cited

U.S. PATENT DOCUMENTS 3,786,762 A * 1/1974 Corkum ............... B60M 1/30
                                                  191/29 R
7,188,716 B2 * 3/2007 Lamschick ........... B60L 5/39
                                                  191/49
(Continued)

FOREIGN PATENT DOCUMENTS

CN   105365582 A    3/2016
CN   106965681 A *  7/2017
(Continued)

OTHER PUBLICATIONS

Japan Patent Office, Notice of Reasons for Refusal, Application No. 2022-536517, Jul. 11, 2023, 10 pages.
(Continued)

*Primary Examiner* — Cheng Lin
(74) *Attorney, Agent, or Firm* — Quarles & Brady LLP

(57) ABSTRACT

A current collector and a method for transferring energy from a conductor rail to a vehicle by means of a current collector, the current collector comprising a carrying device, a contact pressing device and a sliding piece which forms a sliding contact surface, the carrying device for mounting the current collector being formed on a vehicle, the contact pressing device being formed such that by means of the contact pressing device, the sliding piece is moveable relative to a conductor rail and pressable against the conductor rail for forming a sliding contact with a contact pressing force in a sliding contact position, the contact pressing device comprising a rocker unit for generating the contact pressing force using a rocker and a spring member, the spring member being rotatable in such a manner that the sliding piece disposed on the rocker is moveable in one direction into the sliding contact position while generating the contact pressing force, the contact pressing device comprising a retaining element which connects the spring member to the carrying device, the carrying device having a (Continued)

carrying element and a pivot mechanism for positioning the contact pressing device on the vehicle, at least the rocker unit along with the sliding piece being moveable between the sliding contact position and a storing position away from the conductor rail by means of the pivot mechanism.

22 Claims, 7 Drawing Sheets

(56) References Cited

U.S. PATENT DOCUMENTS

| | | | | |
|---|---|---|---|---|
| 11,173,791 | B2 * | 11/2021 | McMahan | B60L 5/39 |
| 2011/0139561 | A1 * | 6/2011 | Sommer | B60L 5/39 |
| | | | | 191/49 |
| 2013/0081915 | A1 * | 4/2013 | Sommer | B60L 5/38 |
| | | | | 191/49 |
| 2015/0090553 | A1 * | 4/2015 | Zhang | B61F 5/52 |
| | | | | 191/49 |

FOREIGN PATENT DOCUMENTS

| | | | |
|---|---|---|---|
| CN | 109130960 | A | 1/2019 |
| DE | 1903746 | A1 | 8/1970 |
| DE | 102009054484 | A1 | 6/2011 |
| JP | 85232812 | U | 3/1977 |
| JP | 857104701 | U | 6/1982 |
| JP | S6036965 | Y2 * | 11/1985 |
| JP | H0622405 | A | 1/1994 |
| JP | H07212908 | A | 8/1995 |
| JP | 2000224705 | A | 8/2000 |
| JP | 2007028890 | A * | 2/2007 |
| JP | 2018160985 | A | 10/2018 |
| JP | 2019135894 | A * | 8/2019 |
| WO | 2013124995 | A1 | 8/2013 |

OTHER PUBLICATIONS

Japan Patent Office, Notice of Reasons for Refusal, Application No. 2022-536517, Jan. 23, 2024, 10 pages.
PCT International Search Report and Written Opinion, PCT/EP2019/086624, Sep. 22, 2020, 18 pages.

* cited by examiner

CURRENT COLLECTOR AND METHOD FOR POWER TRANSMISSION

This application represents the national stage entry of PCT International Patent Application No. PCT/EP2019/086624 filed on Dec. 20, 2019, the contents of which application are incorporated by reference as if set forth in their entirety herein.

The disclosure relates to a current collector and a method for transferring energy from a conductor rail to a vehicle by means of a current collector, the current collector comprising a carrying device, a contact pressing device and a sliding piece which forms a sliding contact surface, the carrying device for mounting the current collector being formed on a vehicle, the contact pressing device being formed such that the sliding piece is moveable relative to a conductor rail by means of the contact pressing device and pressable against the conductor rail for forming a sliding contact in a sliding contact position using a contact pressing force, the contact pressing device comprising a rocker unit for generating the contact pressing force using a rocker and a spring member, the spring member being rotatable in such a manner that the sliding piece disposed on the rocker is moveable in one direction into the sliding contact position while generating the contact pressing force, the contact pressing device comprising a retaining element which connects the spring member to the carrying device.

Current collectors of this kind are known from the state of the art and are commonly used on rail vehicles for transferring electrical energy from a conductor rail to the vehicle. Generally, the conductor rail is disposed in the area of the guide rails and is also referred to as the third rail. With the known current collectors, a sliding piece is mounted on a rocker arm, the rocker arm pressing the sliding piece onto a sliding contact surface of the conductor rail using a defined contact pressing force. When the sliding piece slides onto the conductor rail via a ramp, contact is established between the sliding piece and the conductor rail, the rocker arm then being pressed back via the sliding piece and the necessary contact pressing force thus being exerted.

The contact pressing force is exerted by a spring member which is connected to the rocker arm and actuates it in the manner of a lever. Starting from an unloaded end position of the rocker arm, the spring member generates the contact pressing force when the sliding piece slides onto the conductor rail, the sliding piece making full contact or moving into a maximum sliding contact position. Without contact to a conductor rail, the sliding piece is then moved to an end position. Any horizontal distance fluctuations of the conductor rail relative to the current collector or the rail vehicle can thus be compensated.

The conductor rail can be formed so as to establish contact with the sliding piece from above, below or laterally. Accordingly, the current collector can be formed such that when the sliding piece slides onto the conductor rail via a ramp, the sliding piece is pressed back in the corresponding direction and a contact pressing force is exerted in the opposite direction. Current collectors of this kind are known from DE 10 2009 054 484 B4 and US 2013/0081915 A1, for example.

An extended use of rail networks with vehicles which have corresponding current collectors is often only possible with difficulty because rail vehicle traffic across networks commonly requires a switch in energy supply systems. Thus, the respective rail vehicles must be equipped with additional current collectors for different conductor rail systems or, in some cases, with a pantograph for an overhead wire in order to be able to utilize them for the respective railroads. The railroads are each equipped with an energy supply system, for example a conductor rail or an overhead wire, and are designed accordingly. Depending on the design of an existing railroad, the respectively required current collector can be utilized with a vehicle. However, current collectors commonly enlarge a cross section of the rail vehicle such that the current collector which is disposed in the area of the rails can be damaged easily when energy is transferred via a pantograph and an overhead wire and no conductor rail is provided. Obstacles, such as objects, buildings, plants or the like, can possibly be located within an operating range of the current collector.

Therefore, the object of the disclosure is to propose a current collector, a vehicle having a current collector and a method for transferring energy from a conductor rail to a vehicle, which allow a reliable and flexible switch between energy supply systems.

This object is attained by a current collector having features as described herein, by a vehicle having features as described herein and by a method having features as described herein.

The current collector according to the disclosure for transferring energy from a conductor rail to a vehicle comprises a carrying device, a contact pressing device and a sliding piece which forms a sliding contact surface, the carrying device for mounting the current collector being formed on a vehicle, the contact pressing device being formed such that the sliding piece is moveable relative to a conductor rail by means of the contact pressing device and pressable against the conductor rail for forming a sliding contact in a sliding contact position using the contact pressing force, the contact pressing device comprising a rocker unit for generating the contact pressing force using a rocker and a spring member, the spring member being rotatable in such a manner that the sliding piece disposed on the rocker is moveable in one direction into the sliding contact position while generating the contact pressing force, the contact pressing device comprising a retaining element which connects the spring member to the carrying device, the carrying device having a carrying element and a pivot mechanism for positioning the contact pressing device on the vehicle, at least the rocker unit along with the sliding piece being moveable between the sliding contact position and a storing position away from the conductor rail by means of the pivot mechanism.

The rocker unit of the contact pressing device is thus rotatable such that the unloaded rocker unit and the sliding piece, which is mounted on the rocker unit, can be moved from an end position to the sliding contact position on the conductor rail while generating a contact pressing force. The contact pressing force is exerted solely by the spring member. Thus, the rocker unit allows only a movement of the sliding piece or the rocker between the sliding contact position and the end position. The retaining element serves for mounting the rocker unit on the carrying device of the current collector. An axis or rotation axis is thus disposed between the rocker unit and the retaining element for the rocker unit having the sliding piece. Preferably, the retaining element can be mounted on the carrying device so as to be electrically insulated. The spring member can have a mechanical, pneumatic or hydraulic spring element which is suitable for exerting the contact pressing force.

Since the carrying device is formed so as to have the carrying element and the pivot mechanism, it becomes possible to also pivot the rocker unit along with the sliding piece. Solely the rocker unit or the contact pressing devices generates the contact pressing force. In addition to the rocker unit being pivotable for generating the contact pressing force, the rocker unit along with the sliding piece can be moved between the sliding contact position on the conductor rail or, if no conductor rail is provided, an end position and the storing position at a distance from the conductor rail or the end position. Thus, the pivot mechanism provides an additional pivot range for the rocker unit or the contact pressing device having the sliding piece. Thus, it is also possible to pivot the rocker unit or the contact pressing device having the sliding piece far enough into the storing position that the contact pressing device having the sliding piece no longer protrudes into an operating range relative to a cross section of the vehicle in which the current collector might collide with an obstacle while the vehicle is in motion. When the current collector is not in use, it can be stored safely on the vehicle so that the vehicle can also drive on railroads which would otherwise not be accessible with the current collector.

In one embodiment, the pivot mechanism can comprise an actuator, the actuator being connected to a lever of the retaining element and to the carrying element in such a manner that a linear movement of the actuator can cause a pivoting of the rocker unit between the sliding contact position and the storing position. The actuator can be a linear drive, for example, and cause a change in distance between the lever and the carrying element by means of the linear movement. Thus, the rocker unit connected to the retaining element, or even parts of the retaining element that are rigidly connected to the rocker unit, can be pivoted. In particular the lever of the retaining element can be firmly connected to the rocker unit. The lever of the retaining element can be formed on the rocker unit or be rigidly coupled to the rocker unit via additional components. Thus, pivoting the rocker unit by means of the linear movement of the actuator can allow the sliding piece to be pivoted between the sliding contact position or end position and the storing position.

The carrying element can be a brace which is mountable on the vehicle between wheels of the vehicle. The brace can be formed in the manner of a bar, a longitudinal bar or a rectangular plate. The brace can be easily mounted on a frame of the vehicle or a vehicle body. The current collector can thus be easily mounted.

The retaining element can comprise a mounting plate which is adjustable in height above the conductor rail and mounted on the carrying element, the retaining element forming two pivot bearings which are spaced apart from each other and between which an axis of the rocker unit can be rotatable. The mounting plate and the carrying element can each have a structured surface, for example interlacing grooves which allow a precise height adjustment and prevent a shift of the mounting plate on the carrying element. The pivot bearings which are spaced apart from each other can be formed by bearing eyes in which the axis is rotatably accommodated. The rocker unit can thus be rotated around the axis or be pivoted for generating the contact pressing force.

The actuator can be a pneumatic cylinder or a hydraulic cylinder which can be coupled to the mounting plate or the carrying element and to the lever via respective joints, the lever being non-rotatably connectable to the axis. In principle, it is possible to mount the pneumatic cylinder or the hydraulic cylinder on the mounting plate and not on the carrying element if the mounting plate is rigidly connected to the carrying element. For example, the lever can be screwed into the axis or be clamped on said axis, such that a movement of the lever by means of the pneumatic cylinder or the hydraulic cylinder causes a rotation of the axis. If the rocker unit itself is rotatably connected to the axis via the spring member, the axis can be rotated via the lever, and thus the rocker unit along with the sliding piece can be pivoted according to a linear movement of the pneumatic cylinder or the hydraulic cylinder.

The axis can form a pivot axis of the pivot mechanism, the pivot axis being disposed on the vehicle in an intended mounting position of the current collector in a moving direction of the vehicle. Consequently, the axis can be used, on the one hand, for rotating the rocker and for generating the contact pressing force and, on the other hand, for pivoting from the sliding contact position or the end position to the storing position and vice versa. The current collector can be mounted on the vehicle via the carrying element such that the pivot axis extends in the moving direction of the vehicle. For example, the contact pressing device or the rocker unit having the sliding piece can be pivoted around the pivot axis in the direction of a bottom of a vehicle body or in the direction of a side wall of the vehicle body below the bottom.

According to another embodiment, the pivot mechanism can comprise a pivot drive, the pivot drive being connectable to a bar of the pivot mechanism and to the carrying element in such a manner that a rotational movement of the pivot drive can cause a pivoting of the bar and the retaining element having the rocker unit between the sliding contact position and the storing position. The pivot drive can be a rotational drive by means of which the bar can be rotated or pivoted along its longitudinal axis. If the retaining element having the rocker unit is mounted on the bar, the rocker unit having the sliding piece can be easily rotated between the sliding contact position or end position and the storing position by rotating the bar.

The carrying element can have braces which are mountable on hubs between wheels of the vehicle, the bar being accommodatable between the braces so as to be rotatable on them. The braces are then easily mountable on the hubs and can position the bar so as to be parallel nearby a conductor rail. The bar can be mounted on ends of the respective braces and thus connect the braces.

The pivot drive can be a pneumatic pivot drive or an electric motor which can be coupled to the bar, the bar being connectable to the braces via pivot bearings, damping elements being disposed between each of the braces and the pivot bearings. The pivot drive can be disposed on the bar, within the bar, on the pivot bearing or on the braces. The damping elements can be rubber elements which dampen the vibrations of the hubs. Alternatively, the damping elements can also be disposed on the bar, between the pivot bearings and the bar. By rotating the bar over the pivot bearings, a particularly large pivot range can be formed.

The pivot bearings can form a pivot axis of the pivot mechanism, the pivot axis being disposed on the vehicle in an intended mounting position of the current collector in a moving direction of the vehicle. In this case, it is thus also possible to pivot the contact pressing device or the rocker unit having the sliding piece below a vehicle body in the direction of a bottom or a side wall of the vehicle body. In this case, the rocker can be comparatively short since the contact pressing device can be easily positioned nearby the conductor rail because the braces are provided. At the same time, the contact pressing device can be pivoted into the storing position comparatively far away from the conductor rail because of the large pivoting range of the bar.

In another advantageous embodiment, the pivot mechanism can comprise an actuator, the actuator being connectable to a lever of the pivot mechanism and to the carrying element in such a manner that a linear movement of the actuator can cause a pivoting of the lever and the retaining element having the rocker unit between the sliding contact position and the storing position. The actuator can be a linear drive which connects the lever to the carrying element. The lever can be rod-shaped or plate-shaped and be rigidly connected to the retaining element. The rocker unit, which is rotatable relative to the retaining element and has the sliding piece, can thus be pivoted for generating the contact pressing force irrespective of the pivot mechanism. In this case, the pivot mechanism serves only for pivoting the contact pressing device.

The carrying element can have a carrier which is mountable on a hub of a wheel of the vehicle, the lever being rotatably mountable on the carrier. The carrier can be a plate, for example, which is mountable on the hub. Alternatively, the carrier can be formed by a cover of the hub or a flange or another suitable element for mounting. If the lever is rotatably mounted on the carrier, the retaining element connected to the carrier can be pivoted along with the lever.

The actuator can be a pneumatic cylinder or a hydraulic cylinder which can be coupled to the hub or the carrier and to the lever via respective joints, the lever being connectable to the carrier via a pivot bearing, the lever preferably being a plate. As an alternative to being mounting on the carrier, the pneumatic cylinder or the hydraulic cylinder can be mounted on the hub. The pivot bearing can be a simple pivot bearing, a floating bearing or a fixed bearing, or even a hinge. If the lever is a plate, the pivot bearing can be disposed so as to extend along the plate such that the plate comes into full contact with the carrier in the storing position and the sliding contact position or end position.

The pivot bearing can form a pivot axis of the pivot mechanism, the pivot axis being disposed on the vehicle transverse to a moving direction of the vehicle, preferably vertically, in an intended mounting position of the current collector. When the pivot axis is disposed essentially vertically, the contact pressing device can be pivoted below a bottom of a vehicle body. A height of a sliding piece relative to a conductor rail is thus substantially unaffected by the pivoting process.

The retaining element can comprise a mounting plate which is adjustable in height over the conductor rail and mounted on the carrying element, two pivot bearings which are spaced apart from each other and between which an axis of the rocker unit is rotatably accommodatable being formed on the mounting plate. The carrying element and the mounting plate can have interlacing grooves by means of which a height adjustment in steps is possible and by means of which a shift of the mounting plate on the carrying element can be prevented. The pivot bearings can be bearing eyes in each case which rotatably accommodate the axis of the rocker unit between themselves. It can also be intended that instead of the pivot bearings, clamping elements or screws, for example, are used for mounting the axis.

The retaining element can connect the spring member to the pivot mechanism. In this case, the spring member is directly connected to the pivot mechanism via the retaining element.

The spring member can comprise a coil spring and an axis, the coil spring being non-rotatably connectable to the axis and relaxed in the sliding contact position and in an end position. Thus, it becomes possible to generate a comparatively large contact pressing force. A coil spring can be prestressed over a longer period of time without the risk of a loss of a spring force. The coil spring can be relaxed in a resting position or the end position and the storing position of the contact pressing device. In particular, the coil spring can be realized such that coils of the coil spring rest on each other in the resting position such that only one spring force can be generated in only one rotational direction relative to the longitudinal axis of the coil spring by means of the coil spring. The non-rotatable connection to the axis can ensure that the components of the spring member are safely guided, the coil spring thus being configured to be rotatably mounted on the axis. Preferably, the axis can form a rotation axis for the rocker unit. The coil spring and the axis can be connected, for example, via a spring support or a form-fitting connection between a coil end of the coil spring and the axis.

The rocker unit can comprise a sleeve which is rotatably mounted on the retaining element and which surrounds the spring member, the rocker being disposed on the sleeve. The sleeve can easily protect the spring member against environmental impacts and pollution. The sleeve can also be disposed such on the retaining element that a longitudinal axis of a sleeve corresponds to a rotation axis of the rocker unit. If the rocker is disposed on the sleeve, the rocker can be mounted on or formed on the sleeve as an arm or an extension. The sliding piece can be mounted on the rocker by means of the mounting device, for example by means of a screw connection. Thus, the sliding piece can be easily exchanged. The coil spring can be coupled to the sleeve such that a rotation of the sleeve relative to the retaining element causes the contact pressing force to be generated. Consequently, the coil spring can also be coupled to the retaining element, the contact pressing force thus being able to be generated in only one rotational direction.

For example, the sleeve can be connected to the coil spring by means of a spring connector which is rotatably disposed on the axis. The spring connector can be formed in the manner of a spring support, a coil end of the coil spring engaging in the spring connector in a form-fitting manner. Furthermore, the spring connector can be non-rotatably connected to the sleeve. Thus, the sleeve can also be rotatably mounted on the axis particularly easily. Furthermore, the sleeve can be mounted on the spring connector or the axis using a plain bush as an intermediate layer. Thus, the sleeve is effectively prevented from becoming tilted transverse to the axis.

An axis of the rocker unit can be non-rotatably fastened on the retaining element. For example, the axis can be clamped on the retaining element by means of a clamping element of the retaining element. Alternatively, the axis can be non-rotatably mounted on the retaining element by generating a tensile force in the axis. The tensile force can be formed by means of the retaining element. Thus, it may be sufficient to provide a screw thread having a nut on one end of the axis, the screw thread allowing the axis to be braced. Features for a tool engagement, such as a hexagon, can be formed at an opposite end of the axis. Thus, an end position of the sliding piece can also be set by rotating the axis.

Furthermore, the axis can form a clamping portion which can be fastened on a clamping element of the retaining element. The clamping element can be formed in the manner of a clamp, for example, and engage around a circumference of the clamping portion. Tightening the clamp, for example by means of a screw, causes a force-fitting connection of the axis to the retaining element.

The vehicle according to the disclosure, in particular a rail vehicle, comprises a current collector according to the disclosure.

In addition to the at least one current collector, the vehicle can have a pantograph for transferring energy from an overhead wire to the vehicle. Thus, the vehicle can use different energy supply systems advantageously. Further advantageous embodiments of a vehicle are apparent from the description of features of the dependent claims referring back to device claim 1.

In the method according to the disclosure for transferring energy from a conductor rail to a vehicle by means of a current collector, the current collector is mounted on the vehicle using a carrying device of the current collector, a sliding piece of the current collector being moved relative to the conductor rail by means of a contact pressing device of the current collector, the sliding piece being pressed against the conductor rail in a sliding contact position using a contact pressing force and a sliding contact being formed, the contact pressing force being formed by a rocker and a spring member of a rocker unit of the contact pressing device, the sliding piece disposed on the rocker being moved by means of the rotatable spring member in one direction into the sliding contact position while generating the contact pressing force, a retaining element of the contact pressing device connecting the spring member to the carrying device, the contact pressing device being positioned on the vehicle by means of a carrying element and a pivot mechanism of the carrying device, at least the rocker unit along with the sliding piece being moved from a storing position to the sliding contact position on the conductor rail and vice versa by means of the pivot mechanism. For further details on the advantageous effects of the method according to the disclosure, reference is made to the description of advantages of the current collector according to the disclosure. Further advantageous embodiments of the method are apparent from the description of features of the dependent claims referring back to device claim 1.

Hereinafter, preferred embodiments of the disclosure will be described in more detail with reference to the accompanying drawings.

Figure 1:
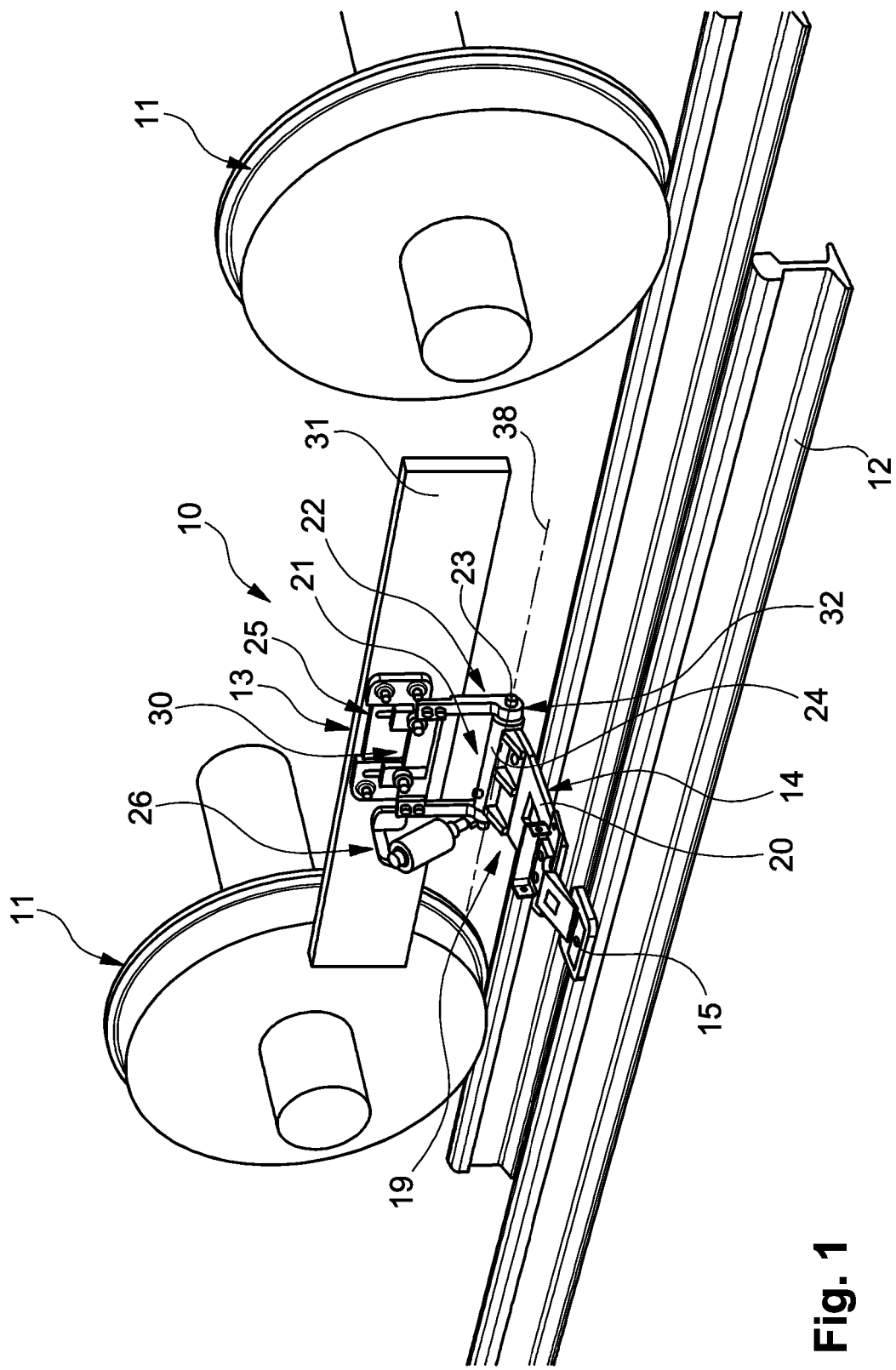
FIG. 1 is a perspective view of a first embodiment of a current collector.
Figure 3:
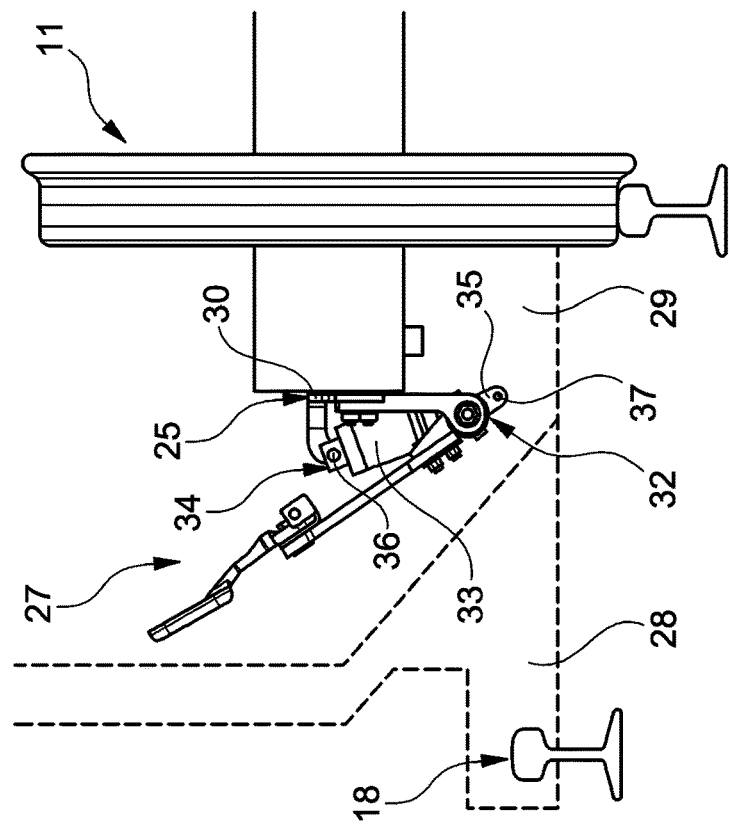
FIG. 3 is a side view of the current collector of FIG. 1 in a storing position.
Figure 2:
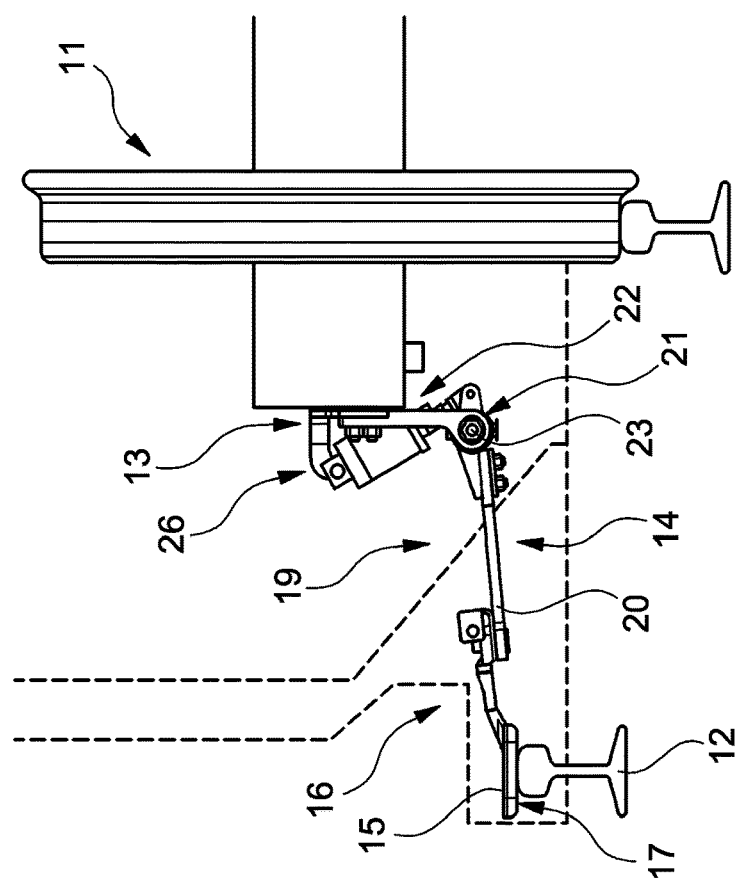
FIG. 2 is a side view of the current collector of FIG. 1 in a sliding contact position.

A combined view of FIGS. 1 to 3 shows a current collector 10 between wheels 11 of a rail vehicle (not further illustrated) on a conductor rail 12. Current collector 10 comprises a carrying device 13 and a contact pressing device 14 and a sliding piece 15. Carrying device 13 serves for mounting current collector 10 on the vehicle (not further illustrated). Sliding piece 15 is connected to contact pressing device 14 and is in contact with conductor rail 12 in a sliding contact position 16 as illustrated. A sliding contact surface 17 of sliding piece 15 is then seated on a surface 18 of conductor rail 12 such that an electrical contact between current collector 10 and conductor rail 12 is established.

Contact pressing device 14 presses sliding piece 15 against conductor rail 12 using a contact pressing force, contact pressing device 14 comprising a rocker unit 19 for generating the contact pressing force using a rocker 20 and a spring member 21. Furthermore, contact pressing device 14 comprises a retaining element 22 which connects spring member 21 to carrying device 13. Spring member 21 is formed by a coil spring (not illustrated) and an axis 23, the coil spring being non-rotatably connected to axis 23. Rocker unit 19 forms a rotatably mounted sleeve 24 which surrounds spring member 21 or the coil spring and axis 23. In particular, rocker 20 is disposed on or screwed into sleeve 24 such that a rotation of sleeve 24 on axis 23 or the coil spring causes a pivoting of rocker 20 with sliding piece 15. Spring member 21 is formed such that the contact pressing force is exerted only in the direction of conductor rail 12. If no conductor rail 12 is provided, sliding piece 15 is disposed in an end position (not illustrated) below the position where conductor rail 12 would otherwise be provided. When sliding piece 15 slides onto conductor rail 12 via a ramp (not illustrated), the coil spring of spring member 21 is stretched and the contact pressing force is generated.

Carrying device 13 comprises a carrying element 25 and a pivot mechanism 26 for positioning contact pressing device 14. Rocker unit 19 along with sliding piece 15 can be moved between sliding contact position 16 and a storing position 27 by means of pivot mechanism 26. Relative to a cross section of the vehicle (not illustrated), contact pressing device 14 having sliding piece 15 is consequently disposed in sliding contact position 16 in an expanded operating range 28 on conductor rail 12 and in storing position 27 in a reduced operating range 29. Thus, it becomes possible to reduce an effective cross section of the vehicle and thus prevent possible collisions with objects or buildings. The options for using such a vehicle on different railway carriages can thus be significantly expanded.

Carrying element 25 is formed by a mounting plate 30 which, in this case, is mounted on an exemplarily illustrated carrier 31 of the vehicles. On mounting plate 30, two pivot bearings 32 of retaining element 22 are mounted which accommodate axis 23. Sleeve 24 is disposed between pivot bearings 32. Pivot mechanism 26 further comprises a pneumatic cylinder 33 which forms an actuator 34 and via which rocker unit 19 having sliding piece 15 can be pivoted from sliding contact position 16 to storing position 27 and vice versa. Pneumatic cylinder 33 is coupled to carrier 31 and to a lever 35 of retaining element 22 via joints 36 and 37. Since lever 35 is non-rotatably connected to axis 23, pneumatic cylinder 33 can easily carry out the pivoting of rocker unit 19 by actuating lever 35. Since axis 23 forms a pivot axis 38, pivot axis 38 is disposed in a moving direction of the vehicle parallel to conductor rail 12, as illustrated.

Figure 4:
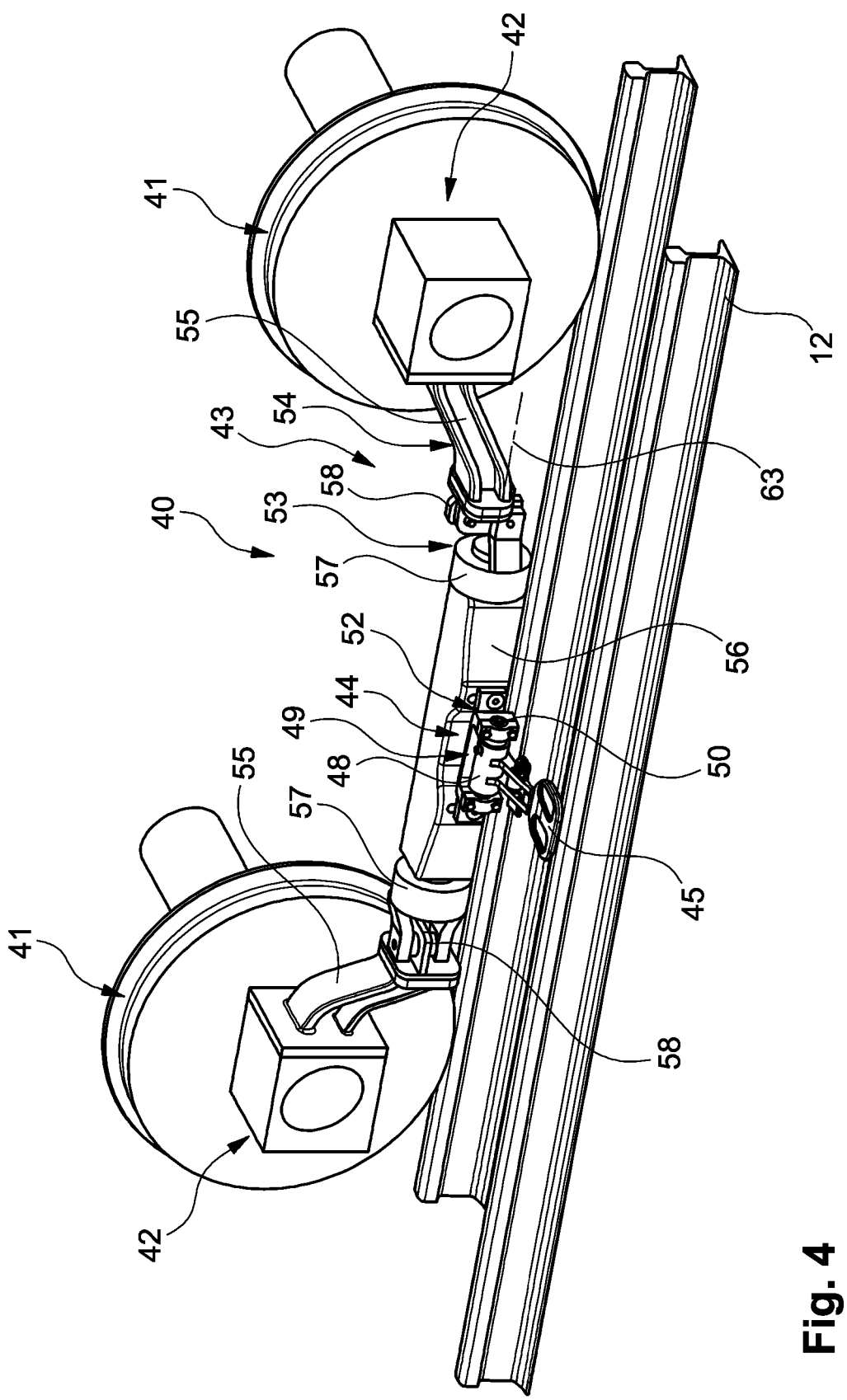
FIG. 4 is a perspective view of a second embodiment of a current collector.
Figure 6:
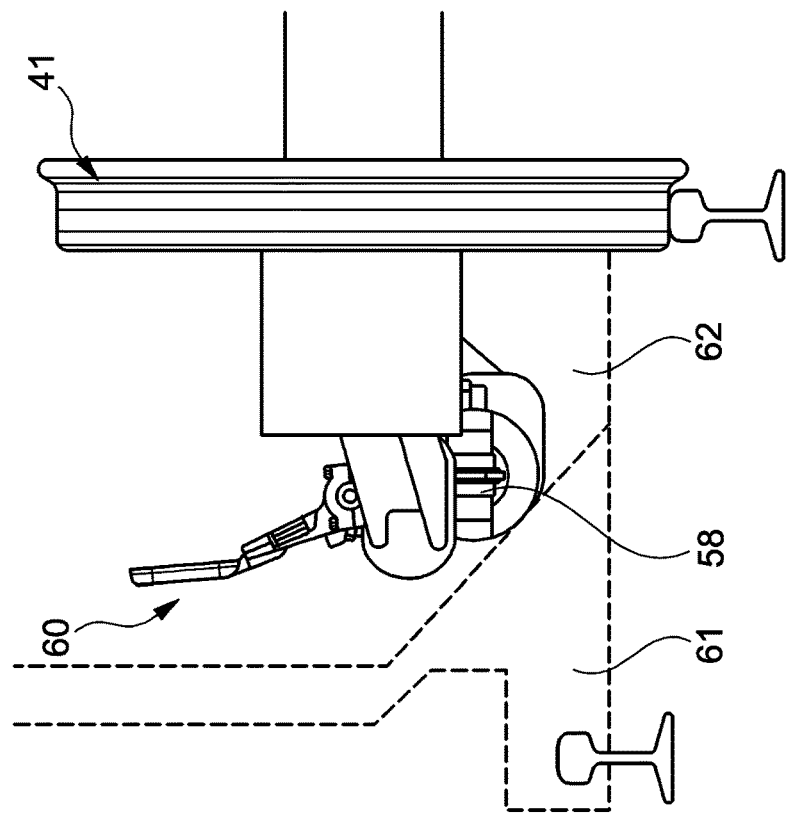
FIG. 6 is a side view of the current collector of FIG. 4 in a storing position.
Figure 5:
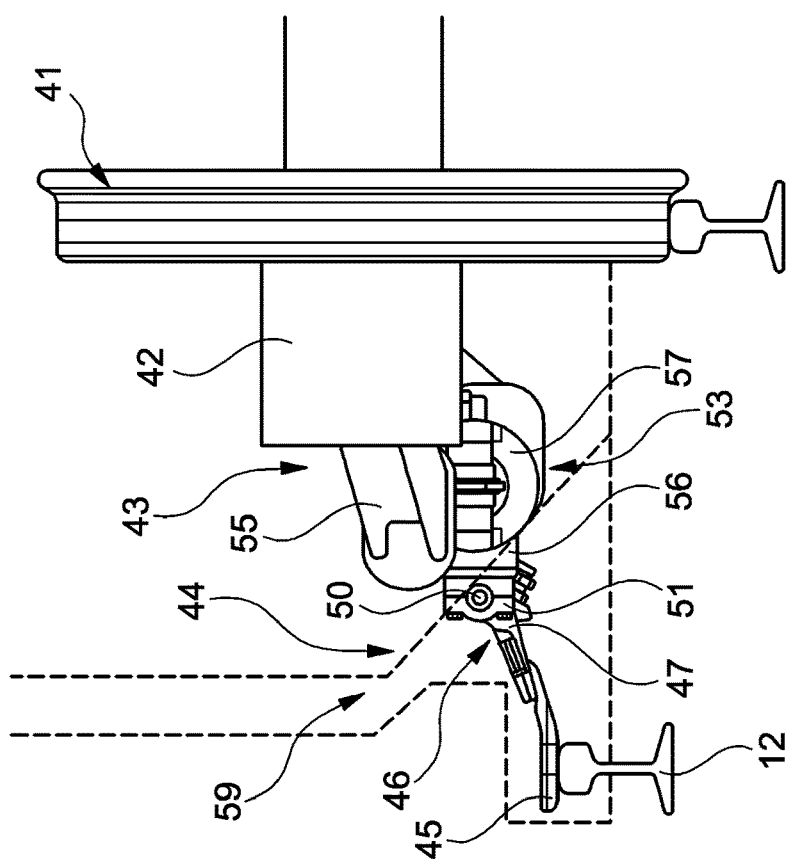
FIG. 5 is a side view of the current collector of FIG. 4 in a sliding contact position.
Figure 7:
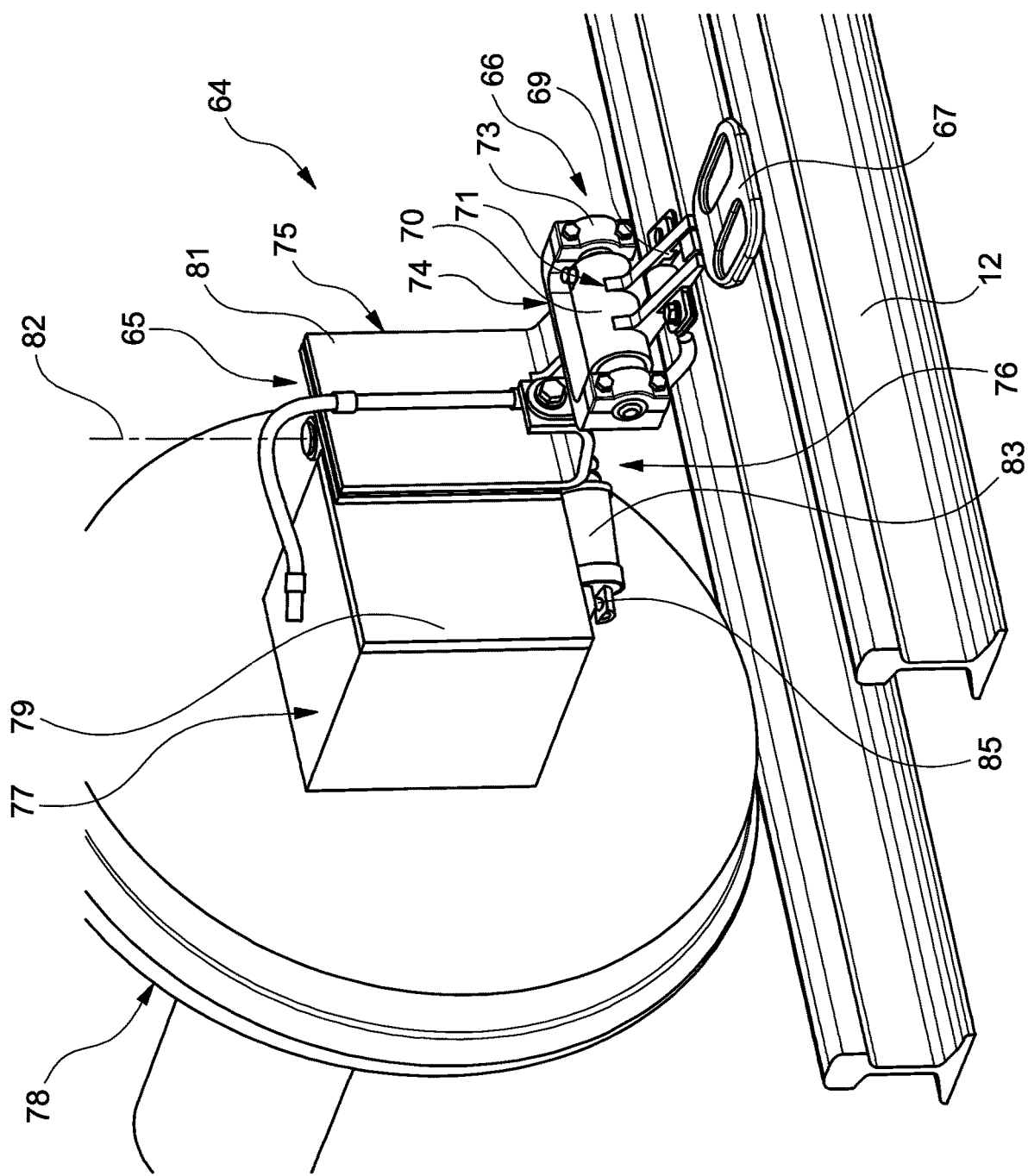
FIG. 7 is a perspective view of a third embodiment of a current collector.
Figure 9:
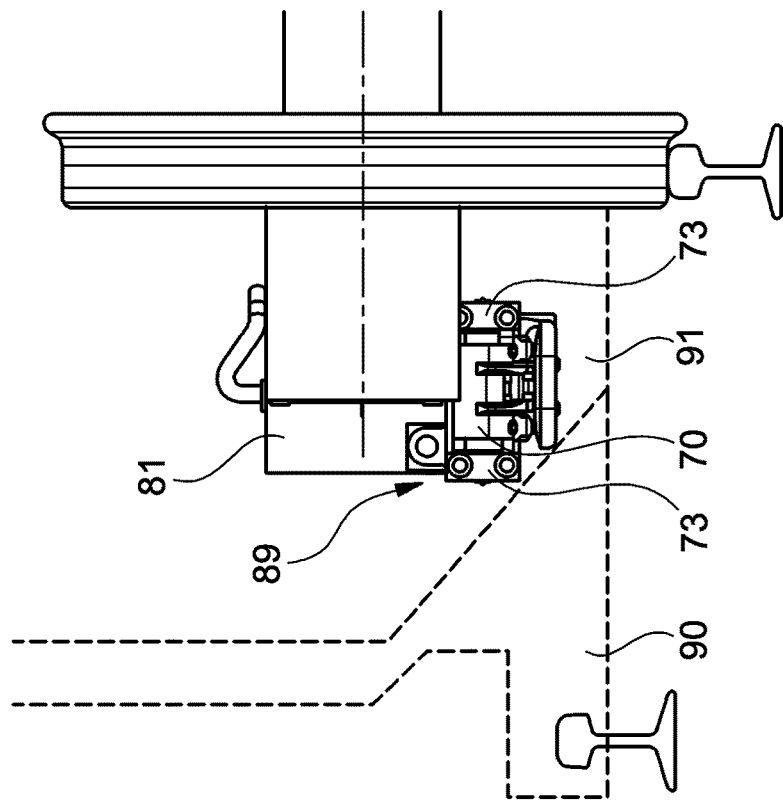
FIG. 9 is a side view of the current collector of FIG. 7 in a storing position.
Figure 8:
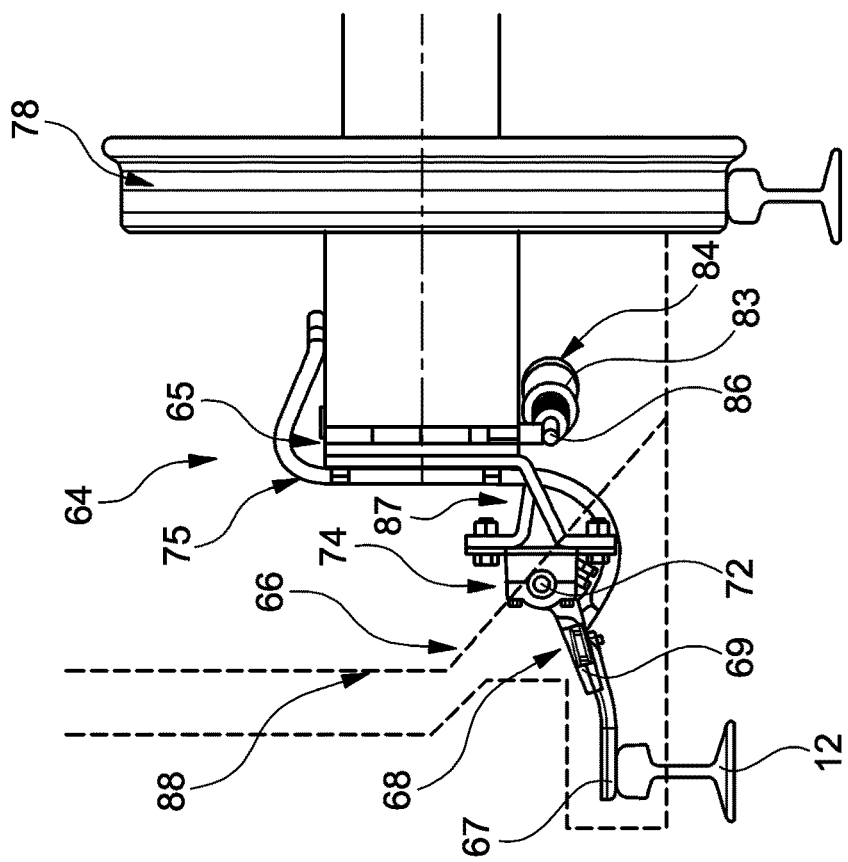
FIG. 8 is a side view of the current collector of FIG. 7 in a sliding contact position.
Figure 10:
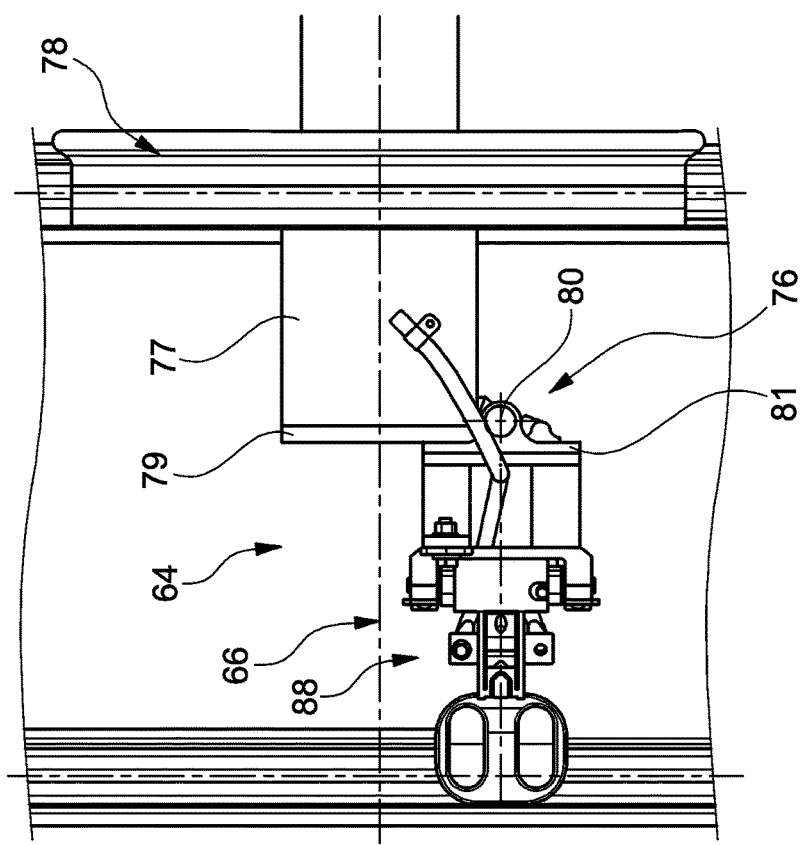
FIG. 10 is a top view of the current collector of FIG. 7 in the sliding contact position.
Figure 11:
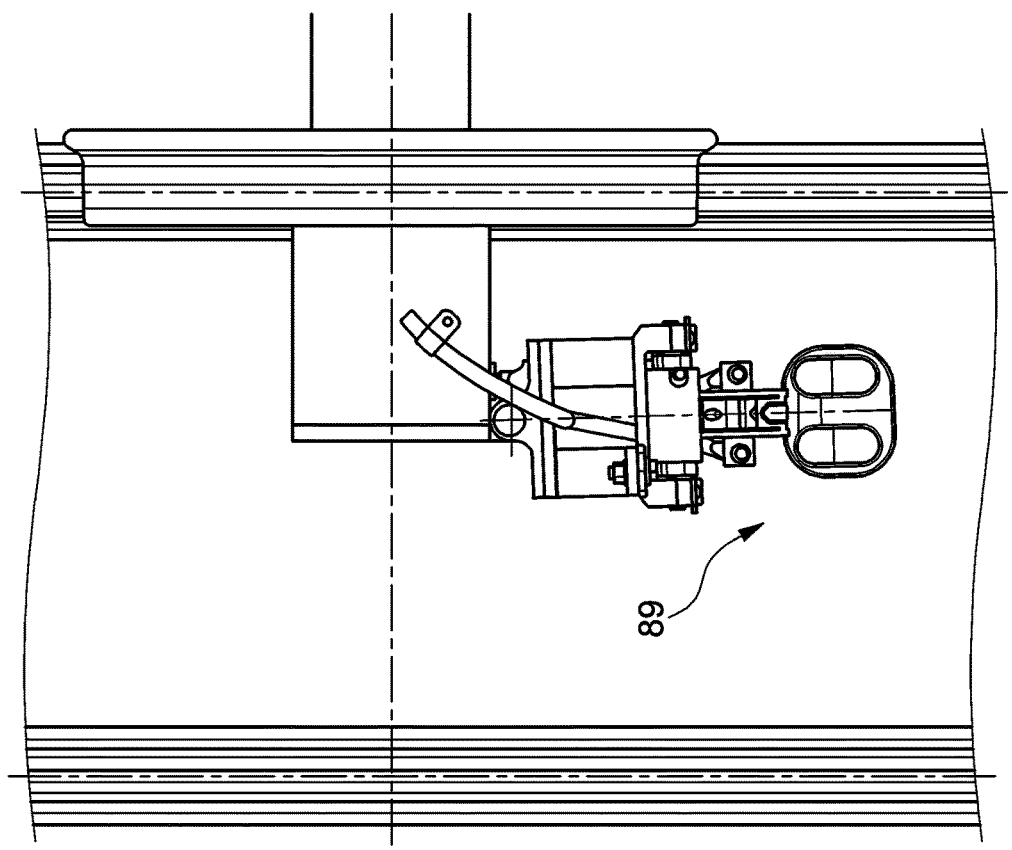
FIG. 11 is a top view of the current collector of FIG. 7 in the storing position.

A combined view of FIGS. 4 to 6 shows a second embodiment of a current collector 40, whereas in contrast to the current collector of FIGS. 1 to 3, current collector 40 is mounted between wheels 41 of a vehicle (not illustrated) on hubs 52 of wheels 41. Current collector 40 also comprises a carrying device 43, a contact pressing device 44 and a sliding piece 45 for contacting conductor rail 12. Contact pressing device 44 is also formed by a rocker unit 46 having a rocker 47 and a sleeve 48 which is formed on rocker 47. Sleeve 48 surrounds a coil spring (not illustrated) of a spring member 49 of rocker unit 46 and an axis 50. Axis 50 is clamped on clamps 51 of a retaining element 52 of contact pressing device 44.

Carrying device 43 comprises a pivot mechanism 53 and a carrying element 54. Carrying element 54 has braces 55 which are mounted on hubs 42. A bar 56 of pivot mechanism 53 is rotatably mounted between braces 55. Bar 56 is connected to braces 55 via pivot bearings 57, respective damping elements 58 being disposed between braces 55 and pivot bearings 57. A pivot drive (not further illustrated) allows a rotation of bar 56 and retaining element 52, which is screwed into said bar 56, and rocker unit 56 having sliding piece 45 from a sliding contact position 59 to a storing position 60 and vice versa. This also results in an expanded operating range 61 in sliding contact position 59 and in a reduced operating range 62 in storing position 60. A pivot axis 53 results from the position of pivot bearing 57, pivot axis 63 extending parallel to conductor rail 12 in the moving direction.

A combined view of FIGS. 7 to 11 shows a third embodiment of a current collector 64, current collector 64 comprising a carrying device 65 and a contact pressing device 66 and a sliding piece 67. Contact pressing device 66 is formed by a rocker unit 68 having a rocker 69 and a sleeve 70 formed thereon. Sliding piece 67 is mounted on rocker 69. Sleeve 70 surrounds a coil spring (not illustrated) of a spring member 71 of rocker unit 68 and an axis 72 of spring member 71. Axis 72 is clamped by means of clamps 73 of a retaining element 74 of contact pressing device 66. Via spring member 71, a contact pressing force can be exerted on conductor rail 12.

Carrying device 65 comprises a carrying element 75 and a pivot mechanism 76. Carrying element 75 is mounted on a hub 77 of a wheel 78 of a vehicle (not further illustrated). Carrying element 75 has a carrier 79 for being connected to hub 77. On carrier 79, a pivot bearing 80 of pivot mechanism 76 is formed which allows a pivoting of a plate 81 of pivot mechanism 76 on pivot bearing 80. A pivot axis 82 of pivot mechanism 76 results from a position of pivot bearing 80 and extends transverse to a moving direction of the vehicle (not illustrated) in the vertical direction. Pivot mechanism 76 comprises a pneumatic cylinder 83 which forms an actuator 84. Pneumatic cylinder 83 is mounted to hub 77 and plate 81 via joints 85 and 86 such that an actuation of pneumatic cylinder 83 causes a pivoting of plate 81. Retaining element 74 is mounted on an extension 87 of plate 81 such that contact pressing device 66 along with plate 81 can be pivoted. Depending on the position of plate 81 parallel or transverse to a moving direction, contact pressing device 66 having sliding piece 67 is disposed in a sliding contact position 88 or in a storing position 89. An expanded operating range 90 results from sliding contact position 88 and a reduced operating range 91 results from storing position 89.

The invention claimed is:

1. A current collector for transferring energy from a conductor rail to a vehicle, the current collector comprising a carrying device, a contact pressing device and a sliding piece which forms a sliding contact surface, the carrying device for mounting the current collector being formed on a vehicle, the contact pressing device being formed such that the sliding piece is moveable relative to a conductor rail by means of the contact pressing device and pressable against the conductor rail for forming a sliding contact in a sliding contact position using a contact pressing force, the contact pressing device comprising a rocker unit for generating the contact pressing force using a rocker and a spring member, the spring member being rotatable in such a manner that the sliding piece disposed on the rocker is moveable in one direction into the sliding contact position while generating the contact pressing force, the contact pressing device comprising a retaining element which connects the spring member to the carrying device, wherein the carrying device has a carrying element and a pivot mechanism for positioning the contact pressing device on the vehicle, at least the rocker unit along with the sliding piece being moveable between the sliding contact position and a storing position away from the conductor rail by means of the pivot mechanism, and wherein the pivot mechanism comprises an actuator, the actuator being connected to a lever of the retaining element and to the carrying element in such a manner that a linear movement of the actuator causes a pivoting of the rocker unit between the sliding contact position and the storing position.

2. The current collector according to claim 1, wherein the carrying element is a brace which is mountable on the vehicle between wheels of the vehicle.

3. The current collector according to claim 1, wherein the retaining element comprises a mounting plate which is adjustable in height above the conductor rail and mounted on the carrying element, the retaining element forming two pivot bearings which are spaced apart from each other and between which an axis of the rocker unit is rotatably accommodated.

4. The current collector according to claim 3, wherein the actuator is a pneumatic cylinder or a hydraulic cylinder which is coupled to the mounting plate or the carrying element and to the lever via respective joints, the lever being non-rotatably connected to the axis.

5. The current collector according to claim 3, wherein the axis forms a pivot axis of the pivot mechanism, the pivot axis being disposed on the vehicle in an intended mounting position of the current collector in a moving direction of the vehicle.

6. The current collector according to claim 1, wherein the pivot mechanism comprises a pivot drive, the pivot drive being connected to a bar of the pivot mechanism and to the carrying element in such a manner that a rotational movement of the pivot drive causes a pivoting of the bar and the retaining element having the rocker unit between the sliding contact position and the storing position.

7. The current collector according to claim 6, wherein the carrying element has braces which are mountable on hubs of the wheels between wheels of the vehicle, the bar being accommodated between the braces so as to be rotatable on them.

8. The current collector according to claim 7, wherein the pivot drive is a pneumatic pivot drive or an electric motor which is coupled to the bar, the bar being connected to the braces via pivot bearings, damping elements being disposed between each of the braces and the pivot bearings.

9. The current collector according to claim 8, wherein the pivot bearings form a pivot axis of the pivot mechanism, the pivot axis being disposed on the vehicle in an intended mounting position of the current collector in a moving direction of the vehicle.

10. The current collector according to claim 6, wherein the retaining element comprises a mounting plate which is adjustable in height over the conductor rail and mounted on the carrying element, two pivot bearings which are spaced apart from each other and between which an axis of the rocker unit is rotatably accommodated being formed on the mounting plate.

11. The current collector according to claim 1, wherein the pivot mechanism comprises an actuator, the actuator being connected to a lever of the pivot mechanism and to the carrying element in such a manner that a linear movement of the actuator causes a pivoting of the lever and the retaining element having the rocker unit between the sliding contact position and the storing position.

12. The current collector according to claim 11, wherein the carrying element has a carrier which is mountable on a hub of a wheel of the vehicle, the lever being rotatably mounted on the carrier.

13. The current collector according to claim 12, wherein the actuator is a pneumatic cylinder or a hydraulic cylinder which is coupled to the hub or the carrier and to the lever via respective joints, the lever being connected to the carrier via a pivot bearing, the lever preferably being a plate.

14. The current collector according to claim 13, wherein the pivot bearing forms a pivot axis of the pivot mechanism, the pivot axis being disposed on the vehicle transverse to a moving direction of the vehicle, preferably vertically, in an intended mounting position of the current collector.

15. The current collector according to any one of the preceding claims, wherein the retaining element connects the spring member to the pivot mechanism.

16. The current collector according to claim 1, wherein the spring member comprises a coil spring and an axis, the coil spring being non-rotatably connected to the axis and relaxed in the sliding contact position and in an end position of the rocker unit.

17. The current collector according to claim 16, wherein the coil spring is coupled to the sleeve in such a manner that a rotation of the sleeve relative to the retaining element generates the contact pressing force.

18. The current collector according to claim 1, wherein the rocker unit comprises a sleeve which is rotatably mounted on the retaining element and which surrounds the spring member, the rocker being disposed on the sleeve.

19. The current collector according to claim 1, wherein an axis of the rocker unit is non-rotatably fastened on the retaining.

20. A vehicle having a current collector according to claim 1.

21. A method for transferring energy from a conductor rail to a vehicle by means of a current collector, the current collector being mounted on the vehicle using a carrying device of the current collector, a sliding piece of the current collector being moved relative to the conductor rail by means of a contact pressing device of the current collector, the sliding piece being pressed against the conductor rail in a sliding contact position using a contact pressing force and a sliding contact being formed, the contact pressing force being formed by a rocker and a spring member of a rocker unit of the contact pressing device, the sliding piece disposed on the rocker being moved by means of the rotatable spring member in one direction into the sliding contact position while generating the contact pressing force, a retaining element of the contact pressing device connecting the spring member to the carrying device,
wherein
the contact pressing device is positioned on the vehicle by means of a carrying element and a pivot mechanism of the carrying device, at least the rocker unit along with the sliding piece being moved from a storing position to the sliding contact position on the conductor rail and vice versa by means of the pivot mechanism, and wherein the pivot mechanism comprises an actuator, the actuator being connected to a lever of the retaining element and to the carrying element in such a manner that a linear movement of the actuator causes a pivoting of the rocker unit between the sliding contact position and the storing position.

22. A current collector for transferring energy from a conductor rail to a vehicle, the current collector comprising a carrying device, a contact pressing device and a sliding piece which forms a sliding contact surface, the carrying device for mounting the current collector being formed on a vehicle, the contact pressing device being formed such that the sliding piece is moveable relative to a conductor rail by means of the contact pressing device and pressable against the conductor rail for forming a sliding contact in a sliding contact position using a contact pressing force, the contact pressing device comprising a rocker unit for generating the contact pressing force using a rocker and a spring member, the spring member being rotatable in such a manner that the sliding piece disposed on the rocker is moveable in one direction into the sliding contact position while generating the contact pressing force, the contact pressing device comprising a retaining element which connects the spring member to the carrying device,
wherein
the carrying device has a carrying element and a pivot mechanism for positioning the contact pressing device on the vehicle, at least the rocker unit along with the sliding piece being moveable between the sliding contact position and a storing position away from the conductor rail by means of the pivot mechanism, and wherein the pivot mechanism comprises an actuator, the actuator being connected to a lever of the pivot mechanism and to the carrying element in such a manner that a linear movement of the actuator causes a pivoting of the lever and the retaining element having the rocker unit between the sliding contact position and the storing position.

\* \* \* \* \*